(12) United States Patent
Papakipos et al.

(10) Patent No.: US 10,332,218 B2
(45) Date of Patent: *Jun. 25, 2019

(54) SOCIAL AD HOC NETWORKING PROTOCOL AND PRESENTATION LAYER

(71) Applicant: Facebook, Inc., Menlo Park, CA (US)

(72) Inventors: Matthew Nicholas Papakipos, Portola Valley, CA (US); David Harry Garcia, Sunnyvale, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,473

(22) Filed: Jun. 12, 2017

(65) Prior Publication Data

US 2017/0278198 A1    Sep. 28, 2017

Related U.S. Application Data

(63) Continuation of application No. 13/276,451, filed on Oct. 19, 2011, now Pat. No. 9,679,336.

(51) Int. Cl.
*G06F 15/16* (2006.01)
*G06Q 50/00* (2012.01)
(Continued)

(52) U.S. Cl.
CPC ........... *G06Q 50/01* (2013.01); *G06Q 10/107* (2013.01); *H04L 51/32* (2013.01); *H04W 8/205* (2013.01); *H04L 51/38* (2013.01); *H04W 84/18* (2013.01)

(58) Field of Classification Search
CPC ..... H04L 67/104; H04L 67/306; H04L 67/18; H04L 63/08; H04L 63/20; H04L 63/0428; H04L 67/1095; H04L 51/32; H04L 67/04; G06F 21/60; G06F 21/6218; G06F 13/00; G06F 1/1632; G06F 1/1686; G06F 3/16
See application file for complete search history.

(56) References Cited

U.S. PATENT DOCUMENTS

| | | | |
|---|---|---|---|
| 2003/0177219 A1* | 9/2003 | Taib | H04L 41/00 709/223 |
| 2006/0218225 A1* | 9/2006 | Hee Voon | G06Q 30/02 709/201 |

(Continued)

*Primary Examiner* — Brian J. Gillis
*Assistant Examiner* — Thao D Duong
(74) *Attorney, Agent, or Firm* — Baker Botts L.L.P.

(57) ABSTRACT

In one embodiment, a method includes implementing an ad hoc network protocol comprising transmitting, from a first mobile device, one or more neighbor messages that includes a first user identifier corresponding to a first user of the first mobile device, wherein the first user identifier corresponds to a user account of the first user in a social networking system, receiving, at the first mobile device, one or more second neighbor messages from one or more second mobile devices that include second user identifiers corresponding to respective second users of the one or more second mobile devices, wherein the second user identifiers correspond to respective user accounts of one or more second users in the social networking system, and storing, at the first mobile device, information received in the one or more second neighbor messages for access by one or more applications hosted on the first mobile device.

14 Claims, 5 Drawing Sheets

(51) Int. Cl.
  *H04L 12/58*   (2006.01)
  *G06Q 10/10*   (2012.01)
  *H04W 8/20*    (2009.01)
  *H04W 84/18*   (2009.01)

(56) References Cited

U.S. PATENT DOCUMENTS

| | | | |
|---|---|---|---|
| 2009/0181653 A1* | 7/2009 | Alharayeri | H04W 4/02 455/414.1 |
| 2009/0210495 A1* | 8/2009 | Wolfson | G06F 17/30566 709/205 |
| 2010/0128701 A1* | 5/2010 | Nagaraja | H04W 76/02 370/338 |
| 2010/0161726 A1* | 6/2010 | Zhu | H04L 51/04 709/204 |
| 2010/0250135 A1* | 9/2010 | Li | H04W 8/005 701/300 |
| 2012/0264375 A1* | 10/2012 | Shankaranarayanan | H04L 12/1475 455/41.2 |

* cited by examiner

FIGURE 5

SOCIAL AD HOC NETWORKING PROTOCOL AND PRESENTATION LAYER

PRIORITY

This application is a continuation under 35 U.S.C. § 120 of U.S. patent application Ser. No. 13/276,451, filed 19 Oct. 2011.

TECHNICAL FIELD

The present disclosure generally relates to social networking systems, and more specifically relates to mobile ad hoc networking and presentation layer functions that incorporate social network system elements.

BACKGROUND

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social networking messages, voicemail, push-to-talk (PTT), and dedicated notification-based message clients such as the Blackberry Messenger and Kik Messenger.

Wireless communications used in carrier-grade networks usually consist of a cell-based infrastructure where all mobile device nodes must communicate directly with a network base station. Alternatively, mobile device nodes may utilize a mobile ad-hoc network for wireless communication, where any mobile device node can communication with any other node, either directly or through multiple hops. Current wireless developments seek to improve Quality of Service so that carrier-grade service may be attained in a heterogeneous wireless environment.

SUMMARY

The present disclosure generally relates to social networking systems, and more specifically relates to mobile ad hoc networking and presentation layer functionality utilizing social networking systems.

In particular embodiments, a method includes implementing an ad hoc network protocol comprising transmitting, from a first mobile device, one or more neighbor messages that includes a first user identifier corresponding to a first user of the first mobile device, wherein the first user identifier corresponds to a user account of the first user in a social networking system, receiving, at the first mobile device, one or more second neighbor messages from one or more second mobile devices that include second user identifiers corresponding to respective second users of the one or more second mobile devices, wherein the second user identifiers correspond to respective user accounts of one or more second users in the social networking system, and storing, at the first mobile device, information received in the one or more second neighbor messages for access by one or more applications hosted on the first mobile device.

These and other features, aspects, and advantages of the disclosure are described in more detail below in the detailed description and in conjunction with the following figures.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

Social Network Systems

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile or account may be associated with a user identifier associated with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

Figure 1:
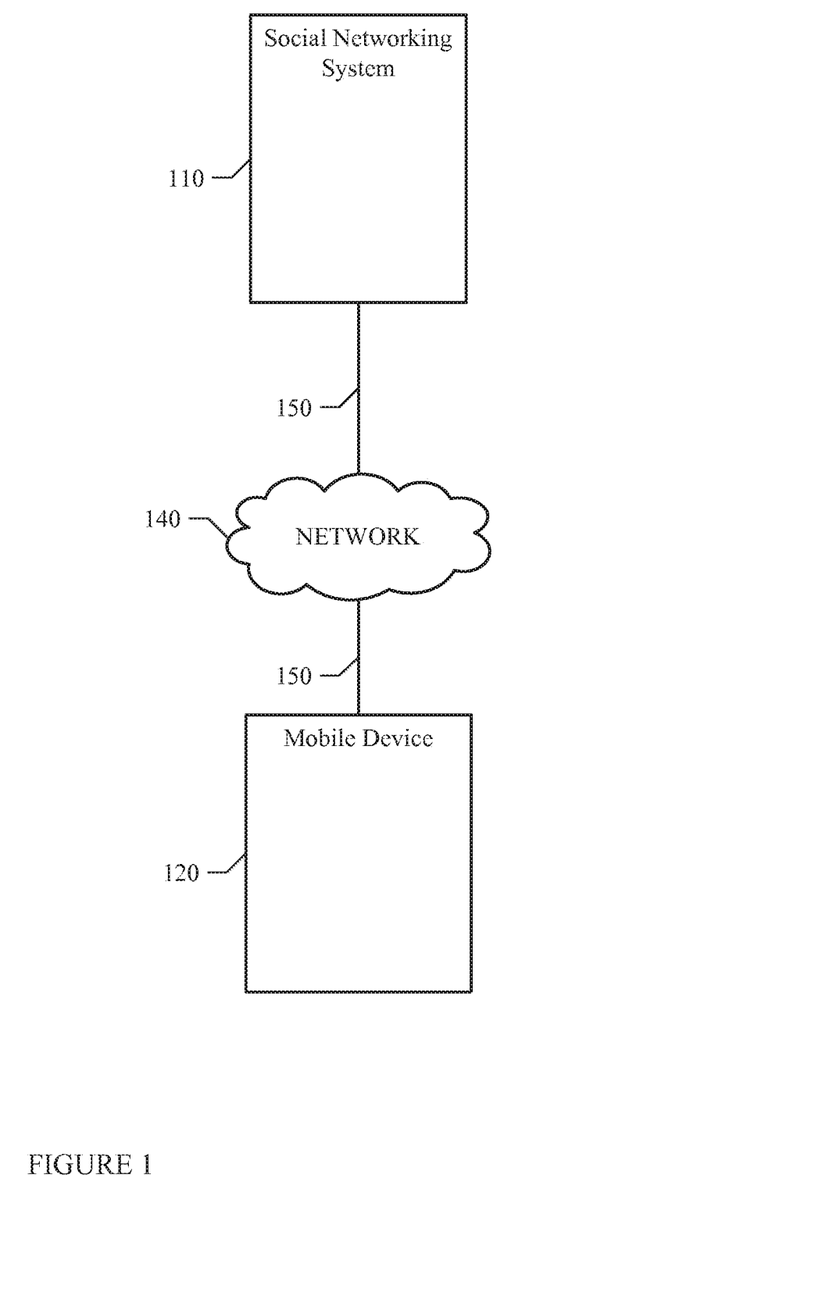
FIG. 1 illustrates an example system.

FIG. 1 illustrates an example system whereby the mobile device 120 interacts with the social networking system 110 through a network 140. In particular embodiments, links 150 illustrate interactions between mobile device 120 and social networking system 110.

Mobile device 120 is generally a computer or computing device including functionality for communicating over a computer network (e.g., remotely). Mobile device 120 may be a laptop computer, personal digital assistant (PDA), in- or out-of-car navigation system, smartphone or other cellular or mobile phone, or mobile gaming device, among other suitable mobile computing devices. Mobile device 120 may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, or another link 150 or a combination of two or more such links 150. The present disclosure contemplates any suitable links 150 coupling mobile device 120 and social networking system 110 to network 140.

Social networking system 110 may have a system front end, which may include web or HTTP server functionality, as well as other functionality, to allow users to access the social networking system 110. Social networking system 110 may have a presence server operative to monitor online presence of users and to provide presence information to one or more requesting clients, such as mobile devices 120. Network 140 generally represents a network or collection of networks (such as the Internet or a corporate intranet, or a combination of both, or an ad hoc network) over which mobile devices 120 may access the social network system 110.

In particular embodiments, the social networking system 110 may have a presence server that maintains data pertaining to user presence received by mobile device 120 and social networking system 110. In particular embodiments, when users of the social networking system 110 access the social networking system, the social networking system may store data that the user is present in a presence server. In particular embodiments, a presence application on mobile device interacts with the presence server of the social networking system 110. The presence server may pull presence information for all mobile devices that are accessing the network and logged into the social networking system. In particular embodiments, the social networking system 110 may continuously receive asynchronous messages at particular time intervals, such as every 30 s, 1 min, 5 min, and so on from the presence application executing on the mobile devices. In particular embodiments, the user may specify that they are "online." In particular embodiments, the user may select preferences for whether their presence information is transmitted to or accessed by the social networking system 110. In particular embodiments, one or more aspects of the user's presence or privacy settings may be stored locally on the mobile device 120 in order to obviate the need for remote access and the settings may be periodically synchronized with the presence server or a privacy controls database in the social networking system 110. The presence application may also retrieve and display the presence information associated with the social network contacts of the user. In addition, information relating to the user's contacts may be stored locally on the user's mobile device.

In particular embodiments of a social networking system 110, a privacy policy database may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database.

In particular embodiments, the privacy policy database may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in the privacy policy database. Particular embodiments contemplate various combinations of granularity of permitted access or denial of access depending on the type of user information and sets of entities with which information may be shared or accessed by the sets of entities, as specified by the user and stored in the privacy policy database.

In particular embodiments of a social networking system 110, an authorization server may enforce the privacy settings of the users of the social networking system. In particular embodiments, the privacy setting of a user determines how particular information associated with a user may be shared. In particular embodiments, as described above, the privacy policy database comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that may potentially access the information. In particular embodiments, the information that may be shared by a user may comprise any aspect of the user profile, events, locations, media, activities, or the news feed associated with the user.

Mobile Networks

Mobile devices may include so-called dual mode functionality including radio frequency (RF) and associated functionality allowing for wireless communication using different network protocols and networks. For example, some dual mode mobile devices allow for packet-based, wireless communications over a cellular network using cellular network protocols, and over wireless local area networks using so-called WiFi or IEEE 802.11 standards. The IEEE 802.11 standard supports both an infrastructure mode where wireless communications are coordinated by an access point and an ad hoc mode where wireless communications are coordinated by a designated peer node. Much of the IEEE 802.11 standard defines a common operation whether using ad hoc or infrastructure mode. The use of ad hoc mode only affects the protocols, so there is generally no impact on the Physical Layers (i.e., 802.11a and 802.11b). Within the Media Access Control (MAC) Layer, all of the carrier sensing and most of the frame types and corresponding usage are the same regardless of which mode is utilized. The absence of an access point, however, means that an ad hoc wireless LAN must take on more of the MAC Layer responsibilities.

Within the semantics of the open systems interconnection (OSI) network architecture, the Data Link Layer protocols respond to service request from the network layer and they perform their function by issuing service requests to the PHY Layer. In some networks, such as IEEE 802 local area networks, the Data Link Layer is described in more detail with MAC and Logical Link Control (LLC) sublayers. In general, the MAC Layer manages and maintains communications between 802.11 stations (radio cards and access points) by coordinating access to a shared radio channel and utilizing protocols that enhance communications over a wireless medium. Often viewed as the "brains" of the network, the 802.11 MAC Layer uses an 802.11 PHY Layer, such as 802.11b or 802.11a, to perform the tasks of carrier sensing, transmission, and receiving of 802.11 frames.

A Media Access Control address (MAC address) is a unique identifier assigned to network interfaces for communications on the physical network segment. MAC addresses are used for numerous network technologies and most IEEE 802 network technologies, including Ethernet and WLAN. MAC addresses are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. MAC addresses are formed according to the rules of one of three numbering name spaces managed by the Institute of Electrical and Electronics Engineers (IEEE): MAC-48, Extended unique identifier (EUI)-48, and EUI-64.

With respect to infrastructure wireless LANs, primary 802.11 MAC functions consist of scanning, authentication, association, wireless encryption protocol (WEP), request-to-send and clear-to-send (RTS/CTS), power save mode, fragmentation, and the like. The 802.11 standard defines various frame types that stations (i.e., NICs and access points) use for communications, as well as managing and controlling the wireless link, such as management frames, control frames, and data frames. Every frame has a control field that depicts the 802.11 protocol version, frame type, and various indicators, such as whether WEP is on, power management is active, and so on. In addition, all frames contain MAC addresses of the source and destination station (and access point), a frame sequence number, frame body and frame check sequence (for error detection).

IEEE 802.11 frames carry protocols and data from higher layers within the frame body. A data frame, for example, could be carrying the HTML code from a web page (complete with TCP/IP headers) that the user is viewing or code associated with a social networking system. Other frames that mobile devices use for management and control carry specific information regarding the wireless link in the frame body. With respect to an infrastructure based network, for example, a beacon's frame body contains the service set identifier (SSID), timestamp, and other pertinent information regarding the access point.

IEEE 802.11 management frames enable stations, such as mobile devices, to establish and maintain communications. Common 802.11 management frame subtypes consist of authentication frames, deauthentication frames, association request frames, association response frames, reassociation request frames, reassociation response frames, disassociation frames, beacon frames, probe request frames, and probe response frames. 802.11 control frames assist in the delivery of data frames between stations. The following are common 802.11 control frame subtypes: Request to Send (RTS) frame, Clear to Send (CTS) frame, and Acknowledgement (ACK) frame. Further, 802.11 defines a data frame type that carries packets from higher layers, such as web pages, printer control data, and the like, within the body of the frame.

Mobile Ad-Hoc Networks

A mobile ad-hoc network (MANET) tends to be comprised of a small group of mobile devices that are all in very close proximity to each other. Mobile ad hoc networks function as fallback mechanism when normally available infrastructure mode gear, such as access points or routers, stop functioning or are unavailable. Each mobile device within the mobile ad-hoc network is free to move independently in any direction, and therefore will change its links to other mobile devices frequently.

Figure 2:
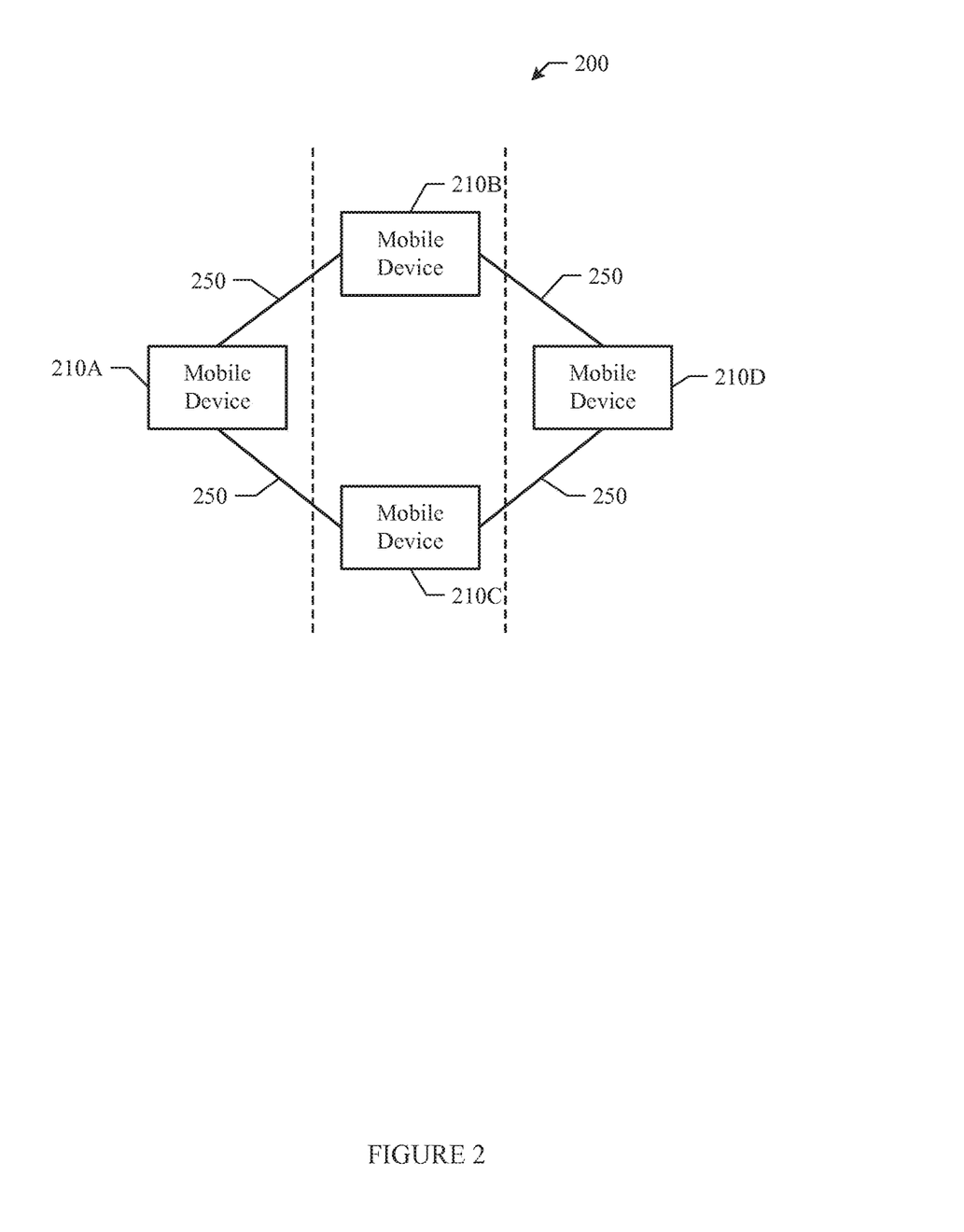
FIG. 2 illustrates an example mobile ad-hoc network system.

FIG. 2 illustrates a system comprising various example structural elements of a mobile ad-hoc network. Mobile devices 210A, 210B, 210C, 210D are all in proximity to each other and each have radio equipment that enables them to communicate to each other via links 250 using any suitable mobile ad hoc network protocols. Particular embodiments may utilize a variety of underlying or enabling network technologies and protocols, including but not limited to, IEEE 802.11, IEEE 802.16, Ethernet, Address Resolution Protocol (ARP), Reverse Address Resolution Protocol (RARP), International Telecommunication Union Telecommunication Standardization Sector (ITU-T) G.hn, High-Level Data Link Control (HDLC), Bluetooth, and the like. Note that only four mobile devices are illustrated in order to simplify the discussion. In practice, there may be tens, hundreds, or even thousands of mobile devices in proximity to each that may join the mobile ad-hoc network. Mobile devices 210A, 210B, 210C, 210D may be so-called dual-mode phones, as discussed above. In particular embodiments, the dual mode mobile devices may use a wireless protocol operating in an unlicensed band (e.g., 802.11 or Bluetooth) to establish mobile ad hoc networks.

PHY/Link Layer

Due to the flexibility of the Carrier Sense Multiple Access with Collision Avoidance (CSMA/CA) protocol, to receive and transmit data correctly it is sufficient that all mobile devices within the Independent Basic Service Set (IBSS) are synchronized to a common clock. The IEEE 802.11 standard, for example, specifies a Timing Synchronization Function (TSF) to achieve clock synchronization between mobile devices. In an infra-structured network the clock synchronization is provided by an access point, and all mobile devices synchronize their own clock to the access point's clock. In an IBSS, due to the lack of a centralized access point, clock synchronization is achieved through a distributed algorithm. Clock synchronization between mobile devices, whether achieved by synchronizing with an access point or in the absence of an access point through a distributed algorithm, is obtained by transmitting beacon frames that contain timing information.

The discovery of existing IBSSs is the result of a scanning procedure of the wireless medium during which a mobile device radio receiver tunes to different radio frequencies, looking for particular control frames. If the scanning procedure does not result in finding any IBSS, the mobile device may start with the creation of a new IBSS. The scanning procedure may either be passive or active. In a passive scanning procedure, the station listens to the channels where it may hear a beacon frame. A beacon frame contains not only timing information for synchronization, but also the complete set of IBSS parameters. This set may include, but is not limited to, the IBSS identifier (IBSSID), the aBeaconPeriod parameter, which defines the length of beacon intervals or periods, the data rates that can be supported, and the parameters relevant to IBSS management functions, such as power saving management. Alternatively, active scanning involves the generation of Probe frames, and the subsequent processing of received Probe Response frames.

In particular embodiments, the mobile devices 210A, 210B, 210C, 210D transmit wireless link layer management frames to create, discover or maintain a mobile ad hoc wireless network. The wireless management frames may include beacon frames, probe frames, probe response frames, request to send (RTS), clear to send (CTS) frames, and the like.

Network Layer, Neighbor Discovery, and Routing Functions

Ad hoc Internet Protocol address (IP address) autoconfiguration for each mobile device may include the configuration of an IP address and netmask or prefix information in Internet Protocol version 6 (IPv6). Mobile devices 210A, 210B, 210C, 210D may employ any IP address configuration scheme suitable for mobile ad hoc networks and any autoconfiguration mechanism may be used as well. In particular embodiments, for example, each mobile device may choose an IP address at random from a pool and perform a Duplicate Address Detection procedure within the MANET to determine whether the randomly chosen IP address is unique across the MANET.

In particular embodiments, to perform this uniqueness check, the mobile device sends an Address Request (AREQ) message, including the randomly chosen tentative non-link-local IP address. This message is broadcast to its neighbors, by sending the message using the all-mobile devices multicast IPv6 address as destination of the packet. The source address used by the node to send the AREQ message is another temporary IP address, acquired only for the purpose of sending these messages. When a mobile device receives an AREQ message, it creates a reverse route entry for the temporary IPv6 address of the mobile device. If the tentative address contained in the AREQ message does not match the address of the receiving mobile device, it rebroadcasts the message to its neighbors. If the IP address of the receiving node matches the tentative address contained in the AREQ message it sends an AddressReply (AREP) message to the sender, indicating that the address is already in use. The route created by the AREQ messages is used to route the message back to the source mobile device. A mobile device waits for a certain amount of time after sending an AREQ message, for the reception of an AREP message. The process is repeated if no answer is received, and if after a number of attempts no AREP has been received, the mobile device assumes that the tentatively chosen IPv6 address is unique and begins using it. The values configured for the involved timers and retry parameters may have an impact on the maximum size of the MANET and may be configured based on a variety of engineering and performance considerations. The foregoing illustrates one of many autoconfiguration protocols that may be used.

Mobile devices 210A, 210B, 210C, 210D may employ any routing protocol suitable for MANETs, including table-driven routing protocols and on-demand routing protocols. An ad hoc routing protocol is a convention, or standard, that controls how mobile devices decide which way to route packets between mobile devices in a mobile ad hoc network. In mobile ad hoc networks, mobile devices do not start out familiar with the topology of their networks, rather, they discover the network topology. Generally, a new mobile device may announce its presence and should listen for announcements broadcast by its neighbors. Each mobile device learns about mobile devices nearby and how to reach them, and may announce that it, too, can reach them.

In table-driven ad-hoc routing protocols, for example, each mobile device may maintain one or more tables containing routing information to every other mobile device in the ad-hoc network. All mobile devices update these tables so as to maintain a consistent and up-to-date view of the ad-hoc network. When the network topology changes, the mobile devices propagate update messages throughout the network in order to maintain a consistent and up-to-date routing information about the network. Various routing protocols differ in the method by which the topology change information is distributed across the network and the number of necessary routing-related tables.

A particular example of a table-driven ad hoc routing protocol is the Destination-Sequenced Distance-Vector (DSDV) Routing Algorithm. In DSDV, each mobile device maintains a routing table that lists all available destinations, the number of hops to reach the destination, and the sequence number assigned by the destination mobile device. The sequence number is used to distinguish stale routes from new ones and thus avoid the formation of loops.

Updates are both time-driven and event-driven. The mobile devices periodically transmit their routing tables to their immediate neighbors, or a mobile device transmits its routing table if a significant change has occurred in its table from the last update that was sent. The routing table updates may be sent in two ways: a full dump or an incremental update. A full dump sends the full routing table to the neighbors and may span many packets whereas in an incremental update sends only those entries from the routing table that have a metric change since the last update. Further, an incremental update fits into a single packet. If there is space in the incremental update packet, then additional entries may be included where the sequence number has changed.

In particular embodiments, when the network is relatively stable, incremental updates are sent to avoid extra traffic and full dumps are relatively infrequent. In a fast-changing network, incremental packets may become large, which will cause full dumps to be more frequent.

Each route update packet, in addition to the routing table information, contains a unique sequence number assigned by the transmitter. The route labeled with the highest (i.e. most recent) sequence number is used. If two routes have the same sequence number, then the route with the best metric (i.e. shortest route) is used. Based on the past history, the mobile devices estimate the settling time of routes. The mobile devices delay the transmission of a routing update by settling time so as to eliminate those updates that would occur if a better route were found very soon.

On-demand routing protocols, in contrast to table-driven protocols, do not maintain up-to-date routes at every mobile device. Instead, the routes are created as and when required. When a source wants to send a message to a destination, it invokes the route discovery mechanisms to find the path to the destination. The route remains valid until the destination is reachable or until the route is no longer needed.

Social Ad Hoc Network Functionality and Presentation Layer

Figure 3:
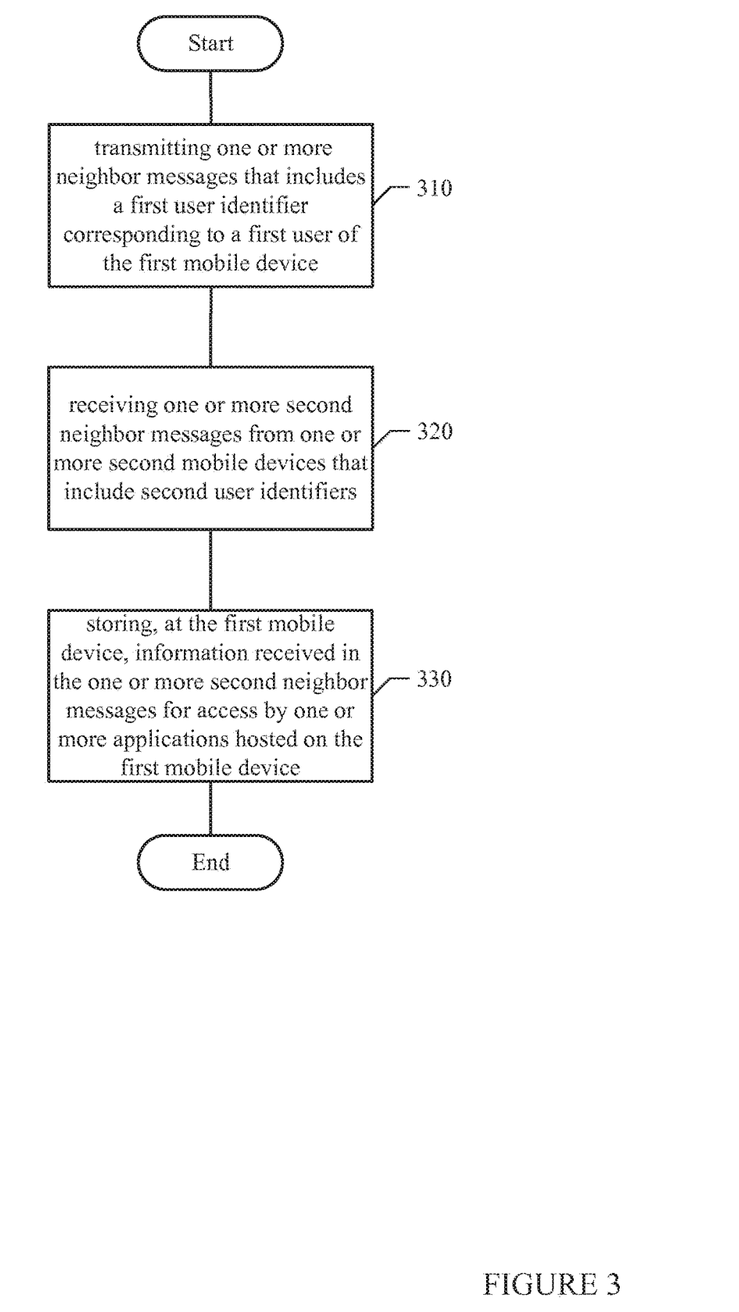
FIG. 3 is a flow chart illustrating an example method of neighbor discovery.

While the ad hoc network protocols described above address the basic link and routing layer functions required to establish communications between mobile devices, they do not address higher level considerations, such as user level discovery and user-to-user communications. FIG. 3 illustrates an example method for mobile device discovery and establishing a social ad-hoc network. Mobile devices 210A, 210B, 210C, 210D may execute a social ad hoc networking protocol as described herein in response to a number of different events, such as loss of cellular network connectivity, an explicit command by a user, and the like. In particular embodiments, for example, a user may invoke an application that launches a local discovery mode, causing the mobile device 210A to seek to join or establish an ad hoc network and potentially discover other social network contacts within local RF range.

The application layer supports network access, as well as provides services for user applications. Within the OSI model of application layer, there is a session layer and a presentation layer. The session layer provides the mechanism of opening, closing, and managing a session between end-user application processes, i.e. a semi-permanent dialogue. In the session layer, communication consists of requests and responses that occur between applications. The presentation layer, in contrast, is responsible for the delivery and formatting of information to the application layer for further processing or display. The presentation layer may also compress data and secure transmitted information through the use of encryption.

In particular embodiments, the first user of the first mobile device may securely communicate with the second user of the second mobile device through the use of the social ad-hoc network rather than an external telecommunications network. More specifically, in particular embodiments, the first user of the first mobile device may chat, SMS, voice dial, Voice over Internet Protocol (VoIP), datagram, or other methods of communication with the second user of the second mobile device. Mobile devices 210A, 210B, 210C, 210D may integrate mobile ad hoc networking with social network elements to enhance operation of social networking systems. In particular embodiments, the messages transmitted between mobile devices 210A, 210B, 210C, 210D to discover and manage a link layer IBSS (beacon frames, probe requests, responses), configure an IP address, discover and maintain routing information, and the like, may be extended with social network information. In particular embodiments, the mobile devices 210A, 210B, 210C, 210D append information elements, such as a user identifier, to the wireless link layer management frames to create, discover or maintain an ad hoc wireless network, as illustrated in steps 310 and 320.

In particular embodiments, extending these messages allows mobile devices 210A, 210B, 210C, 210D to associate IP and/or MAC addresses of the mobile devices 210A, 210B, 210C, 210D with respective user identifiers. In addition, in table-driven networks for example, the tables (or other data structures) may be extended to associate IP and/or MAC addresses of the mobile devices 210A, 210B, 210C, 210D with respective user identifiers, as illustrated in step 330. Accordingly, by operation of mobile ad hoc network discovery, configuration and routing protocols, social network information can be distributed among a set of mobile devices. In particular embodiments, these associations may be used by higher level applications executing on the mobile devices 210A, 210B, 210C, 210D to achieve ad hoc social networking functions.

In particular embodiments, mobile devices 210A, 210B, 210C, 210D may implement a MANET as a standalone network or in connection with an internet-connected gateway (which may be one of the mobile devices itself). In particular embodiments, the mobile devices 210A, 210B, 210C, 210D may implement a MANET concurrently with applications or processes that use a cellular packet radio connection. For example, a mobile device 210A may implement a MANET to run a first application that communicates with other mobile devices 210B, 210C, 210D and a second application that interacts with a social networking system over a cellular packet radio network. In particular embodiments, the MANET functionality may be used as a failover, when a cellular packet radio network connection is unavailable. In particular embodiments, a mobile device 210A may initiate a MANET in response to an application executing on the mobile device 210A.

A user identifier may comprise a userID or other information (e.g., a uniform resource locator, etc.) associated with a user account for a user of a social networking system. In particular embodiments, the userID and other information associated with the social networking system may be encrypted. In particular embodiments, the social network information is encrypted using asymmetric encryption (e.g., Public-Private key encryption). In particular embodiments, for example, each mobile device 210A, 210B, 210C, 210D may obtain an encrypted version of the user identifier corresponding to the respective user, where the encrypted version was encrypted by the social networking system using a private key of the social networking system. In this manner, only other users of the social networking system (who obtain the public key) may decrypt the user identifying information and utilize the user identifier. In particular embodiments, the user identifying information may be encrypted using a symmetric key algorithm, where the encryption key is a function of the user identifier of the user. A mobile device that receives encrypted user identifying information would apply a key generation function to generate keys for all users in a locally stored list, such as a list of user identifiers in a local contacts database. If the decrypted user identifying information matches a user identifier stored in the local contacts database, a match is declared. In this manner, only social contacts of a given user may resolve the user identifying information with relative ease, as opposed to trying all possible combinations of user identifiers to decrypt the information.

Extending MANET messages with social network information allows users to discover and communicate with other users within the MANET when, for example, cellular network conditions would not otherwise permit interaction (such as poor or no cellular service, an oversubscribed cell tower and the like). In particular embodiments, a socially-extended MANET may be used to share media files directly with social network contacts within the MANET without having to upload the files to a central system over a cellular packet radio network.

Figure 5:
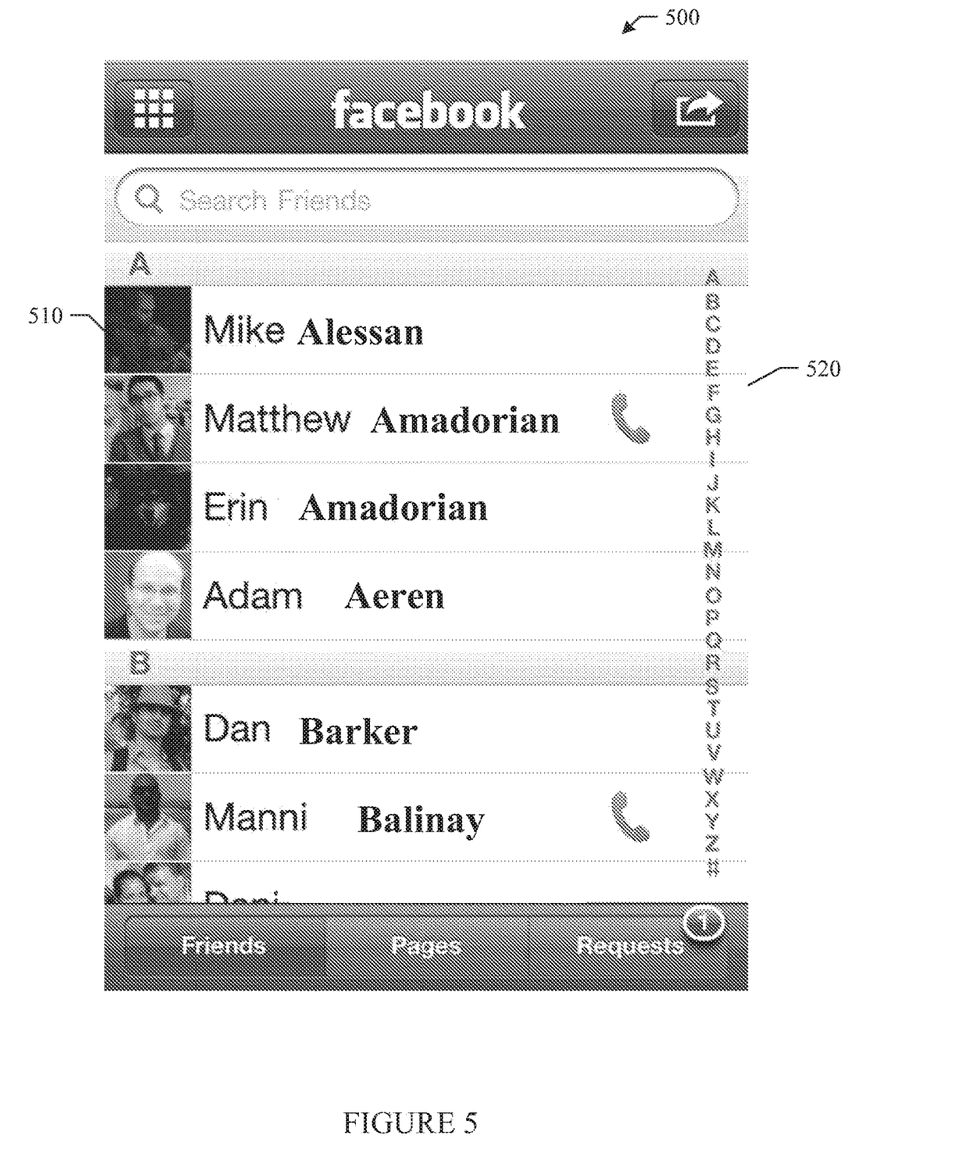
FIG. 5 illustrates an example list of other users who may be available for communication.

In particular embodiments, a messaging application hosted on mobile device 210A, for example, may access the user identifier information available through the socially extended ad hoc networking functions discussed above to present to a user a list of other users that are available for communication. FIG. 5 illustrates an example list 500 of other users who may be available for communication within a messaging application hosted on a mobile device. Example list 500 illustrates all associations 510 of the first user as well as those associations who are available for communication, by illustrating a communication element 520.

The messaging application may be a chat client, a VoIP client and the like. In particular embodiments, when the messaging application has connectivity over a cellular packet radio network it may access the social networking system for presence information of other users. In particular embodiments, when cellular packet radio connectivity fails, the messaging application may access local information gathered during operation of the socially extended MANET functions discussed above in order to display other users who may be present and available for communication. In particular embodiments, the messaging application may access the locally gathered information to augment the information provided by the user, such as indicating which users (in a presence interface, for example) may be within close proximity (based on MANET connectivity generally, and hop count information as well), as illustrated in FIG. 5.

Using the messaging application, a user may select a contact identified in a graphical user interface and conduct a messaging session over the ad hoc network, such as a chat session, a VoIP call and the like. In particular embodiments, a user may capture an image or video and select a social contact of the user to send the image file over the social ad-hoc network. In particular embodiments, for example, users may distribute multimedia images to each other over the MANET as opposed to direct uploads and downloads within the social networking system. In particular embodiments, a peer-to-peer file sharing system can be implemented allowing social network contacts to share captured images with each other that were captured during a particular event.

Particular embodiments, responsive to receiving the user identifier of a second user, access the stored information to identify a valid path between the first mobile device and one of the one or more second mobile devices associated with the second user, as illustrated in step 340. In particular embodiments, a valid path between the first device and one of the one or more second mobile devices may utilize any one or more mobile devices within the ad-hoc network. In particular embodiments, the valid path may utilize only those mobile devices where the users of those mobile devices are members of the social networking system. Further, in particular embodiments, the valid path may utilize only those mobile devices where the second users of the second mobile devices have one or more associations with the first user of the first mobile device within the social networking system. In particular embodiments, the second users of the second mobile devices may be members of the social networking system that reside in the contact list of the first user of the first mobile device, as illustrated in FIG. 5.

In particular embodiments, mobile devices that cannot recognize or access the identifiers for other mobile device may be used along a valid path between mobile devices where the users of the mobile devices are members of the social networking system, associated in some way, or connected by their respective contact lists. In particular embodiments, for example, as discussed above, the user identifying information in the messages used to establish a MANET may be encrypted.

In particular embodiments, where the first mobile device has no access to an external telecommunications network but the second mobile device does, the first user of the first user device may communicate to the second user of the second mobile device in order to place a call to another mobile device through the telecommunications service of the second mobile device.

Figure 4:
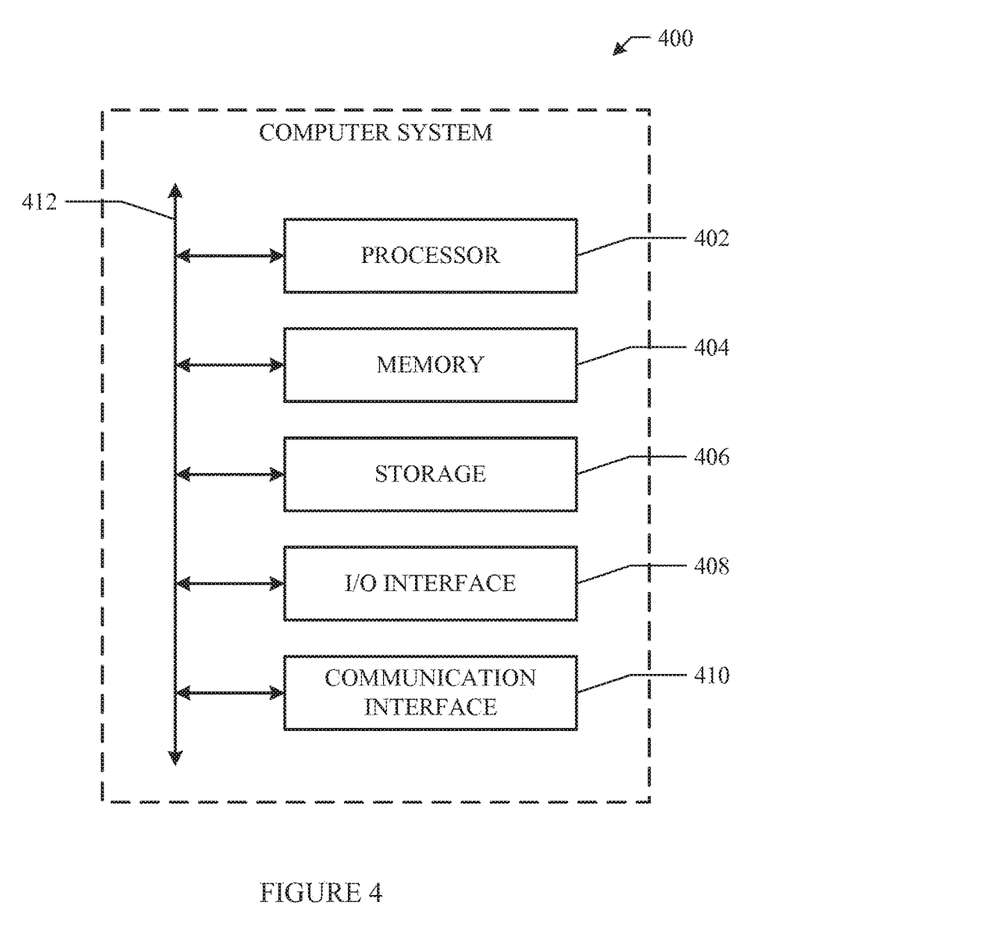
FIG. 4 illustrates an example computer system.

Particular embodiments may be implemented on one or more computer systems. FIG. 4 illustrates an example computer system 400 that may be used to implement a host, such as a server, client desktop computer or mobile device that executes the functionality described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: by one or more computing devices,
    implementing an ad hoc network protocol comprising
        transmitting, from a first mobile device, one or more neighbor messages that includes a first user identifier corresponding to a first user of the first mobile device, wherein the first user identifier corresponds to a user account of the first user in a social networking system;
        receiving, at the first mobile device, one or more second neighbor messages from one or more second mobile devices that include second user identifiers corresponding to respective second users of the one or more second mobile devices, wherein:
            the second user identifiers correspond to respective user accounts of one or more second users in the social networking system, and
            the second user identifiers are encrypted using a private key of the social networking system;
        storing, at the first mobile device, information received in the one or more second neighbor messages for access by one or more applications hosted on the first mobile device, wherein the storing comprises decrypting the second user identifiers using a public key obtained from the social networking system;
        accessing, at the first mobile device, in response to receiving the second user identifiers, the stored information to identify a valid path between the first mobile device and one of the one or more second mobile devices associated with the second user, wherein the valid path is identified based on a routing table maintained by the first mobile device; and
        placing a call, at the first mobile device, between the first mobile device and a number dialed at the first mobile device through a telecommunications service of the second mobile device, wherein
        placing a call, at the first mobile device, between the first mobile device and a number dialed at the first mobile device through a telecommunications service of one of the second mobile devices, wherein
            the first mobile device has no access to an external telecommunications network, the second mobile device has access to the external telecommunications network, and the placing the call is based on the stored information received in one or more of the second neighbor messages.

2. The method of claim 1, wherein the valid path between the first mobile device and one of the one or more second mobile devices associated with the second user comprises one or more hops.

3. The method of claim 2, wherein the valid path comprising one or more hops utilizes only those second mobile devices where the first user of the first mobile device and the second user of the second mobile device have an association in the social networking system.

4. The method of claim 1, wherein the first user and the second user have an association in the social networking system.

5. The method of claim 1, further comprising:
transmitting, from the first mobile device, one or more update messages that includes the first user identifier;
receiving, at the first mobile device, one or more second update messages from the one or more second mobile devices that include the second user identifiers;
updating, at the first mobile device, the stored information previously received with information in the one or more second update messages for access by the one or more applications hosted on the first mobile device.

6. A system comprising:
a memory comprising instructions executable by one or more processors; and
the one or more processors coupled to the memory and operable to execute the instructions, the one or more processors being operable when executing the instructions to:
implement an ad hoc network protocol comprising transmitting, from a first mobile device, one or more neighbor messages that includes a first user identifier corresponding to a first user of the first mobile device, wherein the first user identifier corresponds to a user account of the first user in a social networking system;
receive, at the first mobile device, one or more second neighbor messages from one or more second mobile devices that include second user identifiers corresponding to respective second users of the one or more second mobile devices, wherein:
the second user identifiers correspond to respective user accounts of one or more second users in the social networking system, and
the second user identifiers are encrypted using a private key of the social networking system;
store, at the first mobile device, information received in the one or more second neighbor messages for access by one or more applications hosted on the first mobile device, wherein the storing comprises decrypting the second user identifiers using a public key obtained from the social networking system;
access, at the first mobile device, in response to receiving the second user identifiers, the stored information to identify a valid path between the first mobile device and one of the one or more second mobile devices associated with the second user, wherein the valid path is identified based on a routing table maintained by the first mobile device; and
place a call, at the first mobile device, between the first mobile device and a number dialed at the first mobile device through a telecommunications service of the second mobile device, wherein the first mobile device has no access to an external telecommunications network,
the second mobile device has access to the external telecommunications network, and
the placing the call is based on the stored information received in one or more of the second neighbor messages.

7. The system of claim 6, wherein the valid path between the first mobile device and one of the one or more second mobile devices associated with the second user comprises one or more hops.

8. The system of claim 7, wherein the valid path comprising one or more hops utilizes only those second mobile devices where the first user of the first mobile device and the second user of the second mobile device have an association in the social networking system.

9. The system of claim 6, wherein the first user and the second user have an association in the social networking system.

10. The system of claim 6, further comprising:
transmit, from the first mobile device, one or more update messages that includes the first user identifier;
receive, at the first mobile device, one or more second update messages from the one or more second mobile devices that include the second user identifiers;
update, at the first mobile device, the stored information previously received with information in the one or more second update messages for access by the one or more applications hosted on the first mobile device.

11. One or more computer-readable non-transitory storage media embodying software operable when executed by one or more computer systems to:
implement an ad hoc network protocol comprising transmitting, from a first mobile device, one or more neighbor messages that includes a first user identifier corresponding to a first user of the first mobile device, wherein the first user identifier corresponds to a user account of the first user in a social networking system;
receive, at the first mobile device, one or more second neighbor messages from one or more second mobile devices that include second user identifiers corresponding to respective second users of the one or more second mobile devices, wherein:
the second user identifiers correspond to respective user accounts of one or more second users in the social networking system, and
the second user identifiers are encrypted using a private key of the social networking system;
store, at the first mobile device, information received in the one or more second neighbor messages for access by one or more applications hosted on the first mobile device, wherein the storing comprises decrypting the second user identifiers using a public key obtained from the social networking system;
access, at the first mobile device, in response to receiving the second user identifiers, the stored information to identify a valid path between the first mobile device and one of the one or more second mobile devices associated with the second user, wherein the valid path is identified based on a routing table maintained by the first mobile device; and
place a call, at the first mobile device, between the first mobile device and a number dialed at the first mobile device through a telecommunications service of the second mobile device, wherein
the first mobile device has no access to an external telecommunications network, the second mobile device has access to the external telecommunications network, and the placing the call is based on the stored information received in one or more of the second neighbor messages.

12. The media of claim 11, wherein the valid path between the first mobile device and one of the one or more second mobile devices associated with the second user comprises one or more hops.

13. The media of claim 12, wherein the valid path comprising one or more hops utilizes only those second mobile devices where the first user of the first mobile device and the second user of the second mobile device have an association in the social networking system.

14. The media of claim 11, further comprising:

transmit, from the first mobile device, one or more update messages that includes the first user identifier;

receive, at the first mobile device, one or more second update messages from the one or more second mobile devices that include the second user identifiers;

update, at the first mobile device, the stored information previously received with information in the one or more second update messages for access by the one or more applications hosted on the first mobile device.

* * * * *